Oct. 2, 1956
H. S. HAWKINS
2,765,008
WORK ENGAGING BANDSAW BLADE GUIDE
Filed June 7, 1955
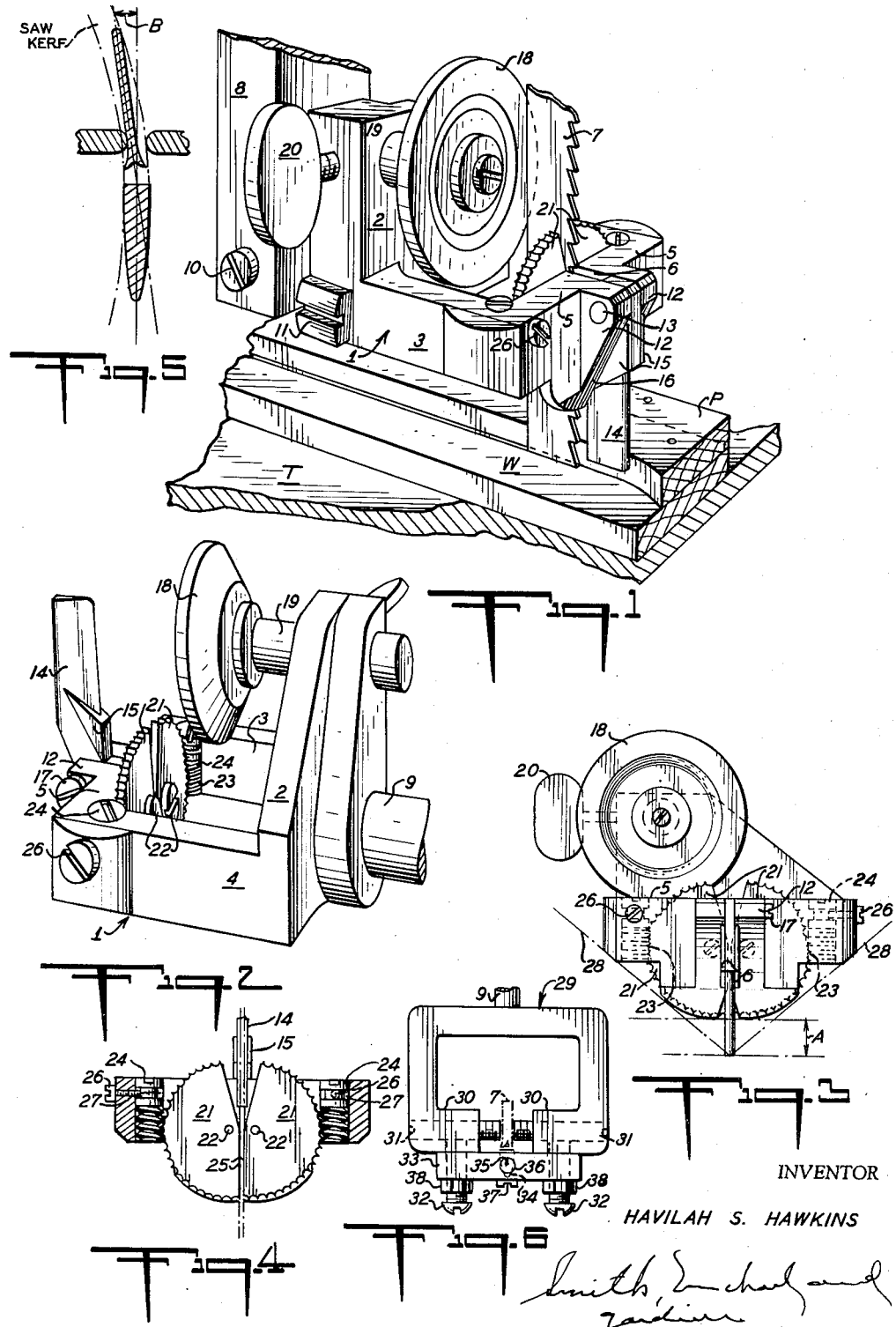
INVENTOR
HAVILAH S. HAWKINS
ATTORNEY

United States Patent Office 2,765,008
Patented Oct. 2, 1956

2,765,008

WORK ENGAGING BANDSAW BLADE GUIDE

Havilah S. Hawkins, Sedgwick, Maine

Application June 7, 1955, Serial No. 513,799

16 Claims. (Cl. 143—167)

This invention relates to a saw guide of the type which may be mounted on a sawing machine in a position to be engaged by a pattern or template attached to a work piece in order to facilitate the accurate cutting of the work without the necessity of previously marking the work piece to indicate the contour of the cuts to be made.

Heretofore work guides for saws have been proposed having the common characteristic that they are placed in apposition to the sides of the blade. Difficulty is experienced, however, in the use of these devices in that although the cut is made parallel to the contour of the template, it is spaced outwardly from the actual edge of the template by the width of the guide itself, resulting in the production of a work piece somewhat larger than the original template. It is therefore an object of this invention to provide a work or template guide which will enable an operator to make accurate cuts to the exact contour and size of a template.

It is also an object of this invention to provide a template or work guide which permits tilting of the work surface of the saw table without necessitating adjustment of the guide.

It is a further object of this invention to provide a template or work guide placed entirely in front of the cutting edge of a saw blade and in alignment therewith and of a thickness substantially equal to that of the toothed edge of the blade.

Another object of this invention is to provide a template or work guide which is pivotally mounted so as to be easily moved from an operative to an inoperative position.

Another object of the invention is to provide a saw guide of the character described in which blade guide means are provided which are positioned to engage the sides of the saw blade rearwardly of but close to the toothed edge of the blade and at points close to the work. This permits lateral flexure of the blade and permits it to follow the kerf in work having curved contours.

These and other objects of the invention will become apparent from the following specification when read in the light of the accompanying drawings wherein I have illustrated preferred embodiments of my invention and wherein Fig. 1 is a perspective view of the invention as used when attached to a band saw machine, parts of the machine being broken away, Fig. 2 is a perspective view of the saw guide of the present invention showing the pivoted work guide in elevated position, Fig. 3 is a front elevation of the invention, Fig. 4 is a sectional view taken on the line 4—4 of Fig. 2, Fig. 5 is a diagrammatic view showing the aligned relationship of the saw blade and guide, and the flexure of the blade when the saw kerf is curved, Fig. 6 is a plan view of a modified form of guide.

Referring more particularly to the accompanying drawings wherein like reference numerals are used to designate like parts throughout, the invention is shown as comprising a frame member indicated generally by the reference character 1, said frame member including a base portion 2 and a pair of spaced forwardly projecting arm 3 and 4. Each of the arms is provided with an inturned toe portion 5 which toe portions terminate in spaced relation in respect to each other to provide a saw blade slot 6 to accommodate a saw blade 7 when mounted on a sawing machine such as shown in Fig. 1. In this figure, the major portions of the sawing machine are not illustrated but the work table T thereof is shown together with a work piece W having a pattern P secured thereto, the work piece and pattern being shown on the table in the position they occupy during an actual sawing operation. It will be understood that the machine includes a head frame 8 to which the frame member 1 of the present invention may be attached by means of a rearwardly projecting pin 9 removably mounted in the base plate 2 and entered in a suitably provided bore in the head frame 8. The pin 9 may be secured within the head frame 8 by any convenient means such as by the set screw 10, and may be secured within a suitable bore within the base 2 by any means such as a set screw 11.

The toe portions 5—5 of the frame member carry forwardly projecting lugs 12 which are spaced apart substantially the same distance as the blade slot 6. A pivot pin 13 is mounted in lugs 12 and extends transversely of the blade slot. The pin 13 provides a pivotal mounting for a fin or work guide member 14 which, as shown in Fig. 1, may depend from the pivot pin 13 just forwardly of and in alignment with the saw blade 7. The fin or guide 14 is generally triangular in cross sectional outline as shown in Fig. 5 and is provided on its opposite side faces with abutment members 15 which in the operative position of the fin or guide 14 engage the forward inclined faces 16 of the lugs 12. This arrangement provides means for firmly positioning the fin 14 in operative position when in use by bracing the fin against the lugs 12 to thus resist pressure of the work thereagainst in sawing, while at the same time providing an arrangement by which the fin may be swung about the pivot 13 into a vertical or inoperative position as shown in Fig. 2. If desired the pin 13 may be provided with a screw head 17 to facilitate insertion and removal thereof when it is desired to replace the fin or guide 14 by one of a different size, as will be hereinafter explained.

The guide of the present invention also includes a backing wheel for the saw blade 7, said wheel being indicated by the reference character 18 and mounted for rotation about a substantially horizontal axis on a shaft 19 adjustably mounted in a bore within the base plate 2 as shown in the drawings. The shaft 19 may be shifted longitudinally within the base plate 2 and secured in any desired adjusted position by a set screw 20. By this means, the wheel 18 may be positioned properly with respect to the rear edge of the saw blade 7 as shown in Fig. 1.

As is well known in the art, it is frequently desirable when sawing out a plurality of work pieces of the same size and contour, to mount upon the upper surface of a work piece W a template or pattern member P which will function as a guide for the operator in passing the work piece through the saw as shown in Fig. 1. In this practice, and particularly where the contour of the work piece deviates appreciably from a straight line, the saw blade has a tendency to bind or rub unduly within the kerf made by the saw as the work piece is shifted laterally with respect to the saw blade in order to cut along a curved line, unless provision is made for lateral flexure of the saw blade. With this in mind, the guide of the present invention includes means for permitting lateral flexure of the rear portion of the saw blade while maintaining the toothed edge of the saw blade in alignment with the work guide or fin 14. To this end the toe portions 5—5 of the frame 1 carry saw blade guide means in the form of complemental saw guide or abutment members 21 mounted on opposite sides of the blade slot 6 on the inner face of said toe portions. The abutment members 21—21 are adjustably mounted on the toe portions 5—5 by means of pivot pins 22, each such pivot pin being in the form of a threaded member passing through an appropriate aperture in the abutment members and into threaded bores within the toe portions. The abutment members 21 are provided with peripheral portions 23 which are concentric with the pivot pins 22. Furthermore, the periphery of the members 21 are toothed and are in engagement with the threads of threaded adjustment pins or gear members 24 which as clearly shown in Fig. 4 are mounted for rotation within vertical bores provided in the arms 3 and 4 of the frame members. The bores which receive the pins 24 open longitudinally thereof through the inner faces of the respective arms 3 and 4 for engagement with the toothed periphery of the respective abutments 21—21. Thus by rotation of the threaded pins or gear members 24, the members 22 may be rotatably adjusted about their respective axes to move the saw engaging surfaces 25 thereof into contact with the lateral faces of the saw blade 7. The arrangement of the abutment members 21, the pivots 22, and the threaded pins 24, is clearly shown in Fig. 4 and it will be understood that this design permits the abutment members 21 to be adjusted inwardly towards the blade from time to time, to compensate for wear. This insures proper alignment of the toothed edge of the blade at all times with the fin or work guide 14. In order to maintain the threaded pins 24 against longitudinal movement and to secure them in a desired position of adjustment, I provide transverse screw members 26, the inner terminal portions of which are positioned to lie within annular grooves 27 provided in the pins 24 and, when desired, to be forceably and frictionally engaged with the threaded members 24 to retain them against rotation after being adjusted. It will be noted that the locking screw 26 for the threaded pin 24 at the left hand side of the frame as viewed in Fig. 3 passes through the front face of the frame member 1 whereas the locking screw 26 for the right hand threaded pin 24 passes through the side face of the arm 4 of the frame. The position of the last mentioned locking pin 26 is to avoid interference between it and the screw head 17 of the pivot pin 13 for the fin or guide 14 when the latter must be removed to replace the fin 14.

It will be noted from Fig. 1 that the blade abutment members 21 are positioned with respect to the blade 7 so that the abutment members engage the blade member rearwardly of but close to the root line of the teeth of the blade. This, in effect, fixes the forward cutting edge of the blade in alignment with the fin or guide 14 while permitting the rear edge of the blade to flex laterally as shown in Fig. 5 and thereby readily follow arcuate kerfs cut in the work by the blade.

It will also be noted in connection with the saw engaging abutment members 21 that the lower edges thereof project appreciably below the bottom edge of the frame member, into reasonably close proximity to the upper surface of the work W, or pattern member P. This arrangement permits great latitude in tilting the saw table top when desired to cut bevels, and still provide clearance between the frame and work. This relationship is indicated by the construction lines 28 in Fig. 3, and it will be appreciated that it is desirable to keep the distance A as there shown, as small as possible.

As previously indicated, the fin or guide 14 is mounted for pivotal movement about a horizontal axis defined by the pin 13 so when not in use, it may occupy a position such as shown in Fig. 2. In order to provide a clear view to the operator of the cutting edge of the saw when the fin is not in use, the lug members 12—12 which support the fin, are downwardly and rearwardly inclined as clearly shown in Fig. 1.

As shown in Fig. 2 the pivot pins 22—22 for the saw abutment members 21 are positioned substantially in horizontal alignment with the axis of mounting pin 9 for the frame 1 so that by removal of the pin 9, the kerfed heads of the pins 22 may be readily engaged by a screw driver passed through the bore in the base plate 2, which normally accommodates the mounting pin 9. This relative position of the pin 9 with respect to the frame 1 generally, and to the work guide 14, and/or the saw slot 6, provides means whereby the saw slot may be readily aligned with the saw blade by shifting the frame as a unit about the axis of the pin 9. It will also be noted that the backing wheel 18 for the saw blade 7 is disposed in a position such that the wheel 18 is but slightly removed above the point of contact between the saw and the work. This insures effective action of the wheel 18 in backing up the saw blade and restraining it against rearward deflection due to pressure on the blade from the work.

While it is desirable to pivotally support the fin or guide 14 in the manner described, so that it may be moved readily to and from operative position, one of the principal advantages of the present invention is the provision of a fin or guide which is positioned forwardly of and in alignment with the saw blade 7 in contradistinction to the common use in the prior art of the work-engaged saw guides which are positioned laterally of the saw blade. Thus, if desired, a fin or guide can be counted as shown in Fig. 6, where no provision is made for pivotal movement thereof. In this modification, the frame member 1 which carries the guide elements is indicated generally by the reference character 29, the same being provided with inwardly directed toe portions 30 which carry saw guide or abutment members in the form of threaded studs 31 which are positioned to engage the lateral faces of the saw blade 7 close to the toothed forward edge of the blade. The stud members 31 may be secured in adjusted position by bolt members 32 which pass through the front faces of the toe portions 30 and into frictional contact with the guide studs 31. The bolt members 32 may also secure to the frame member 29 a transverse bar 33 which carries the fin or work guide 34, the latter being supported by a stem portion 35 thereof, mounted within a bore 36 in the bar 33 and secured therein by a set screw 37. The fin or work guide 34 as shown is generally triangular in cross sectional contour and is positioned in alignment with the saw blade 7. The bolt member 32 may be locked in position by lock nuts 38. It will be understood by those skilled in the art that the modification shown in Fig. 6 includes a tapered fin or work guide mounted forwardly of and in alignment with the saw blade, as well as lateral blade guide means which may be adjusted to compensate for wear but that the arrangement as described in Fig. 6 does not provide the advantages incident to the pivotal mounting of the fin or work guide 14 nor the refinement of adjustment for wear of the saw guides 21, nor the proximity of the lower portions of such to the plane of the work, as are resident in that form of the invention illustrated in Figs. 1 to 4, inclusive.

As previously suggested, in the modification shown in Figs. 1 to 4, inclusive, the fin or work guide 14 may be readily replaced when desired, by a fin or work guide of different dimensions. Thus it may be found desirable to provide a series of fins or work guides 14 which may differ one from the other in respect to the transverse dimension thereof at the rear edge which is in apposition to the forward cutting edge of the saw, as when saw blades of different thickness are encountered. Also it might be desired to provide work guides 14 which differ in length to accommodate the guide to work pieces and/or pattern pieces of different thickness.

In use, it will be understood that a pattern piece P may be secured to a work piece W in superimposed position as shown in Fig. 1 and the combined pattern and work piece moved over the table T through the saw while maintaining the profile edge of the pattern piece P in contact with the work guide 14. The rounded or inclined side face of the guide 14 (see Fig. 5) provides a proper fulcrum surface on which the profiled edge of the pattern piece may be rocked or rolled when curved contours are being sawed, the abutment members 21—21 maintaining the forward toothed edge of the saw in alignment with the work guide 14 while permitting flexure of the rear portions of the blade beyond said abutment members, to enable the rear edge of the saw to follow the contoured kerf formed by the blade, as illustrated diagrammatically in Fig. 5.

It will be understood, of course, that the space between the opposed ends of the toe portions of the frame members and designated the "saw slot," facilitates assembly of the attachment on a saw machine, since by removing the "work guide" member the "slot" is open to permit passage of the saw blade through the frame to the space enclosed thereby.

Having thus described preferred embodiments of my invention, it will be understood by those skilled in the art that various changes may be made in the size and proportion of parts of the invention as disclosed, without departing from the spirit of the invention, which is set forth more particularly in the appended claims.

What I claim is:

1. In combination, a saw machine including a saw member, a frame member mounted on said saw machine in proximity to said saw member, and a work guide carried by the frame member, said work guide having substantially the same transverse dimension as that of the cutting edge of the saw member and being disposed in front of the saw member and substantially in coplanar alignment therewith.

2. In combination, a saw machine including a saw member and a work table, a frame member mounted on said machine above the work table thereof and in proximity to said saw member, and an elongated work guide depending from the frame member toward the work table in front of and substantially in coplanar alignment with the saw member.

3. In combination, a saw machine including a saw member and a work table, a frame member mounted on said machine above the work table thereof and in proximity to said saw member, an elongated work guide carried by the frame member forwardly of the saw member and depending from the frame member toward the work table and in alignment with the saw member, said work guide being movably mounted on said frame member for selective placement in either a depending operative position or in an upstanding inoperative position.

4. In combination, a saw machine including a saw member and a work table, a frame member mounted on said machine above the work table thereof and in proximity to said saw member, an elongated work guide carried by the frame member forwardly of the saw member and depending from the frame member toward the work table and in alignment with the saw member, said work guide being pivotally mounted upon the frame member for swinging movement about a substantially horizontal axis disposed near the upper end of said work guide.

5. In combination, a saw machine including a saw member and a work table, a frame member mounted on said machine above the work table thereof and in proximity to said saw member, an elongated work guide carried by the frame member forwardly of the saw member and depending from the frame member toward the work table and in alignment with the saw member, said work guide being pivotally mounted upon the frame member for swinging movement about a substantially horizontal axis disposed near the upper end of said work guide, said work guide adjacent to the toothed edge of the saw member being of substantially the same transverse dimension as is the saw member.

6. In combination, a saw machine including a saw member and a work table, a frame member mounted on said machine above the work table thereof and in proximity to said saw member, an elongated work guide carried by the frame member forwardly of the saw member and depending from the frame member toward the work table and in alignment with the saw member, said work guide being pivotally mounted upon the frame member for swinging movement about a substantially horizontal axis disposed near the upper end of said work guide, and saw guide members carried by the frame member and positioned on opposite sides of the median plane of the work guide in apposition to the saw member, said saw guide members being engageable with said saw member at opposed points on a level between the lower end of the work guide member and the pivotal axis thereof.

7. An attachment for a saw machine comprising a frame member having an opening through which a saw member is adapted to operate, said frame member including abutment members disposed on opposite sides of the path of movement of a saw member and in apposition thereto, and a work guide member carried by the frame member in front of said abutment members and substantially in coplanar alignment with the path of travel of said saw as defined by said abutment members.

8. An attachment for a saw machine comprising a frame member having an opening through which a saw member is adapted to operate, said frame member including abutment members disposed on opposite sides of the path of movement of a saw member and in apposition thereto, and a work guide member carried by the frame member forwardly of said abutment members and in alignment with the path of travel of said saw as defined by said abutment members, said work guide member depending below the general plane of said frame member and being pivoted about a substantially horizontal axis, and complemental means carried by the work guide member and the frame member to resist rearward movement of said work guide member in response to pressure thereon of work applied thereto during sawing operations.

9. An attachment for a saw machine comprising a frame member having an opening through which a saw member is adapted to operate, said frame member including abutment members disposed on opposite sides of the path of movement of a saw member and in apposition thereto, and a work guide member carried by the frame member forwardly of said abutment members and in alignment with the path of travel of said saw as defined by said abutment members, said work guide member depending below the general plane of said frame member and being pivoted about a substantially horizontal axis, and complemental means carried by the work guide member and the frame member to resist rearward movement of said work guide member in response to pressure thereon of work applied thereto during sawing operations, said work guide member at the rear edge thereof being of substantially the same transverse dimension as the path of movement of the saw as defined by said abutment members.

10. In a saw guide, a frame having an opening through which a saw member is adapted to operate, means for confining a saw member within said frame to a predetermined path of travel comprising spaced abutment members, each such member including a segmental gear member having a toothed periphery, means mounting said segmental gear members for movement about spaced axes parallel to and on opposite sides of the path of movement of a saw member within the frame as defined by said abutment members, and gear members in engagement with the toothed periphery of the respective segmental gear members for rotating the latter about said axes, each of said segmental gear members having a saw engaging abutment surface movable into engagement with a saw within the frame by said gear members.

11. The saw guide described in claim 10 wherein means are provided for locking said segmental gear members in adjusted position.

12. In a saw guide, a frame having an opening through which a saw member is adapted to operate, means for confining a saw member within said frame to a predetermined path of travel comprising spaced abutment members, each such member including a segmental gear member having a toothed periphery, means mounting said segmental gear members for rotation about spaced axes parallel to and on opposite sides of the path of movement of a saw member within the frame as defined by said abutment members, and gear members in engagement with the toothed periphery of the respective segmental gear members for rotating the latter about said axes, each of said segmental gear members having a saw engaging abutment surface movable into engagement with a saw within the frame by said gear members, and a work guide carried by the frame member forwardly of said segmental gear members and in alignment with the path of movement of a saw within said frame as defined by the abutment surfaces of said segmental gear members.

13. In a saw guide, a frame having an opening through which a saw member is adapted to operate, means for confining a saw member within said frame to a predtermined path of travel comprising spaced abutment members, each such member including a segmental gear member having a toothed periphery, means mounting said segmental gear members for rotation about spaced axes parallel to and on opposite sides of the path of movement of a saw member within the frame as defined by said abutment members, and gear members in engagement with the toothed periphery of the respective segmental gear members for rotating the latter about said axes, each of said segmental gear members having a saw engaging abutment surface movable into engagement with a saw within the frame by said gear members, said gear means comprising screw threaded pins mounted in said frame member for rotation about axes transverse to the pivotal axes of said segmental gear members with the threads of said pin members in operative engagement with the toothed periphery of the said segmental gear members.

14. In a saw guide, a frame member having an opening through which a saw member is adapted to operate, guide means for a saw within the frame comprising spaced abutment members, a pivot pin for each abutment member, said pins being carried by the frame member and disposed on opposite sides of the path of travel of the saw, the frame member including a base plate having an aperture therethrough in general alignment with the axes of said abutment mounting pins, and mounting member for the frame removably secured within the aperture in the base plate so that when the frame mounting means is removed, access may be had to the abutment mounting pins through the opening in the base plate.

15. A saw guide comprising a frame member provided with an opening through which a saw member is adapted to operate, means within the frame for defining the path of movement of a saw member, a work guide carried by the frame forwardly of the saw member and in alignment therewith, mounting means for said work guide comprising spaced lug members projecting forwardly from the frame member, a transverse pin carried by said lug members and on which the work guide member is pivotally mounted, said lug members tapering downwardly and rearwardly from the axis of said pin member whereby to provide unrestricted view of the saw at its forward edge when said work guide member is moved about its pivot to an upstanding inoperative position.

16. An attachment for a saw machine comprising a frame member having a saw receiving opening in which a saw member is adapted to operate, and a work guide member carried by the frame member forwardly of said saw receiving opening, said work guide having substantially the same transverse dimension as that of the saw member adapted to be received within said opening and mounting means on the frame member positioned with respect to the work guide so that the frame member may be mounted on a saw machine with the saw thereof disposed within said saw receiving opening rearwardly of said work guide and substantially in coplanar alignment therewith.

References Cited in the file of this patent

UNITED STATES PATENTS

| | | |
|---|---|---|
| 82,171 | Staats | Sept. 15, 1868 |
| 313,025 | Rowlett | Feb. 24, 1885 |
| 394,110 | Fraser | Dec. 4, 1888 |
| 427,316 | Harley | May 6, 1890 |
| 444,851 | Rice | Jan. 20, 1891 |
| 523,994 | Pineo | Aug. 7, 1894 |
| 535,383 | Long | Mar. 12, 1895 |
| 964,846 | Brueggemann | July 19, 1910 |